(12) United States Patent
Jabbar et al.

(10) Patent No.: US 10,397,065 B2
(45) Date of Patent: Aug. 27, 2019

(54) SYSTEMS AND METHODS FOR CHARACTERIZATION OF TRANSIENT NETWORK CONDITIONS IN WIRELESS LOCAL AREA NETWORKS

(71) Applicant: General Electric Company, Schenectady, NY (US)

(72) Inventors: Abdul Jabbar, Altamont, NY (US); Matthew Richard Pekarske, Grafton, NY (US); Marc Robert Pearlman, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 37 days.

(21) Appl. No.: 15/381,372

(22) Filed: Dec. 16, 2016

(65) Prior Publication Data
US 2018/0176071 A1 Jun. 21, 2018

(51) Int. Cl.
*H04L 12/24* (2006.01)
*H04W 24/08* (2009.01)
*H04L 12/26* (2006.01)
*H04W 84/12* (2009.01)

(52) U.S. Cl.
CPC ........ *H04L 41/142* (2013.01); *H04L 41/5009* (2013.01); *H04W 24/08* (2013.01); *H04L 41/0823* (2013.01); *H04L 43/08* (2013.01); *H04L 43/16* (2013.01); *H04W 84/12* (2013.01)

(58) Field of Classification Search
CPC .................................................... H04L 41/142
See application file for complete search history.

(56) References Cited

U.S. PATENT DOCUMENTS

| | | |
|---|---|---|
| 7,269,157 B2 | 9/2007 | Klinker et al. |
| 7,561,517 B2 | 7/2009 | Klinker et al. |
| 7,962,582 B2 | 6/2011 | Potti et al. |
| 8,103,480 B2 | 1/2012 | Korn et al. |
| 2002/0038366 A1 | 3/2002 | Harasawa |
| 2003/0225549 A1 | 12/2003 | Shay et al. |
| 2006/0176824 A1 | 8/2006 | Laver et al. |

(Continued)

OTHER PUBLICATIONS

Habib et al., "On Detecting Service Violations and Bandwidth Theft in QoS Network Domains", Purdue University Computer Science Technical Reports, pp. 1-24, 2001.

(Continued)

*Primary Examiner* — Jason E Mattis

(57) ABSTRACT

A method for real-time monitoring and characterization of network conditions experienced by a client device coupled to a WLAN via at least one access point is presented. One or more primary performance parameters of the WLAN for a given operating interval of the client device uplink to the access point are received. At least one derived performance parameter based on the one or more primary performance parameters is computed. Trends of the primary performance parameter and the derived performance parameter are analyzed to identify occurrence of at least one problem signature. A situational awareness state characterizing the network conditions based on the at least one problem signature is defined. The situational awareness state is further processed to identify the occurrence of at least one transient fault condition in the WLAN.

21 Claims, 8 Drawing Sheets

(56) References Cited

U.S. PATENT DOCUMENTS

| | | | |
|---|---|---|---|
| 2008/0303956 A1* | 12/2008 | Nakagawa | H04N 5/44 |
| | | | 348/723 |
| 2015/0207696 A1 | 7/2015 | Zhang et al. | |
| 2016/0345270 A1* | 11/2016 | HomChaudhuri | H04W 52/08 |
| 2016/0373994 A1* | 12/2016 | Yiu | H04L 5/14 |
| 2017/0078921 A1* | 3/2017 | Xia | H04W 28/08 |
| 2017/0332292 A1* | 11/2017 | Ponnuswamy | H04L 43/16 |
| 2017/0339630 A1* | 11/2017 | Ketonen | H04W 48/16 |

OTHER PUBLICATIONS

Thiele et al., "Defeating DDOS Attacks", Cisco White Papers, vol. 4, pp. 101-104, Jan. 23, 2014.

* cited by examiner

|  | C1 | C2 | C3 | C4 |
|---|---|---|---|---|
|  | 0 - 5 seconds | 5 - 60 seconds | 60 seconds - 1 hour | > 1 hour |
| INITIAL ASSOCIATION (R1) | Connection Failure | | | |
| | Poor signal strength | | | |
| | Poor data rate (MCS) | | | |
| | Misconfigured Device | | | |
| | Misconfigured Network | | | |
| STEADY STATE (R2) | Excessive noise | Unrecognizable failure – hung NIC | | |
| | Poor signal strength | Poor average data rate | | |
| | Application failure | Congestion | | |
| | Co-channel Interference | Receiver overload – broadcast storm or network loop | | |
| ROAMING AND MOBILITY (R3) | | Sub-optimal roaming | | |
| | | Wireless coverage | | |
| | | Access point coverage | | |
| | | Access point instability | | |
| | High Mobility | | | |

FIG. 4

SYSTEMS AND METHODS FOR CHARACTERIZATION OF TRANSIENT NETWORK CONDITIONS IN WIRELESS LOCAL AREA NETWORKS

BACKGROUND

Embodiments of the present specification relate generally to wireless local area networks, and more particularly to systems and methods for real-time monitoring and characterization of transient network conditions experienced by client devices that are coupled to the wireless local area networks.

A wireless local area network (WLAN) is a wireless computer network that links two or more components or devices using a wireless distribution method within a determined area such as a home, school, hospital, computer laboratory, or office building. Currently, WLAN hardware and protocols predominantly follow various versions of the IEEE 802.11 standard. In general, all components that can connect into a wireless medium in a WLAN are referred to as stations (STA). Typically, the stations are equipped with WLAN hardware, firmware, and drivers, also known as Wireless Network Interface Controllers (WNIC). These stations may be generally categorized as wireless access points (APs) and client devices. In one example, the wireless APs may include wireless routers which act as base stations for the WLAN. Some non-limiting examples of mobile and fixed client devices include patient monitoring devices, ambulatory hubs, wearable devices, mobile phones, tablets, laptops, handheld devices, and servers.

Wireless local area networks based on the IEEE 802.11 standard operate in several different modes. In one example, the client devices connect to the APs to join the WLAN. This enables users of the client devices to move around within a local coverage area and still be connected to the network. Moreover, the WLAN also provides a connection for the client devices to the wider Internet.

Typically, the APs are strategically located at different locations within the local coverage area to provide the desired wireless service to client devices within range. Further, when a client device enters the WLAN, the client device may associate itself with one of the APs to communicate application data to an end device or another client device. Also, the client device may roam freely by transitioning from one access point (AP) to another AP within the coverage area of the WLAN.

Generally, in caregiving facilities such as hospitals, the client devices are primarily wireless telemetry devices. Wireless telemetry devices have a sensing component and a communication component that enable the measurement of physical or biological parameters and transmission of the measured data over a communication network. The performance and dependability of patient monitoring and telemetry is heavily dependent on the wireless local area network. Wireless telemetry devices are predominantly mobile, transitioning between APs within the coverage area of the hospital WLAN. Typically, device manufacturers of these wireless telemetry devices enter a service level agreement (SLA) with the hospitals to stipulate a minimal level of service that the wireless network must provide to a wireless telemetry device. However, enforcement of the SLA may be problematic because of the transient nature of the wireless links between client devices and various APs of the WLANs.

Commonly, network performance with respect to the SLA may be determined at the AP by collecting network wide statistics. However, these statistics may only serve as a representation of general network health. Also, these statistics may fail to capture transient network characteristics in real-time at different coverage areas of the WLAN. In one example, statistics collected at the APs of the WLAN may capture the quality-of-service characteristics of the network. However, transient congestion points at certain network coverage areas may not be detectable at the APs. Moreover, these statistics may be limited to downlink traffic, overlooking key network metrics that may be only determined from client devices transmitting on the uplinks to the APs. Furthermore, leveraging the distributed location and mobility of the client devices within the wireless local network coverage area to discover transient network characteristics in real-time is often overlooked.

BRIEF DESCRIPTION

In accordance with certain aspects of the present specification, a method for real-time monitoring and characterization of network conditions experienced by a client device coupled to a wireless local area network via an uplink and a downlink to at least one access point of the wireless local area network is presented. The method includes receiving at least one primary performance parameter corresponding to the wireless local area network for at least one operating interval of the client device uplink to the at least one access point of the wireless local area network and computing at least one derived performance parameter based on the at least one primary performance parameter. Additionally, the method includes analyzing trends of the at least one primary performance parameter and the at least one derived performance parameter to identify occurrence of at least one problem signature. Also, the method includes defining a situational awareness state characterizing the network conditions experienced by the client device based on the at least one problem signature. Moreover, the method includes processing the situational awareness state via one or more analytic functions to identify occurrence of at least one transient fault condition in the wireless local area network.

In accordance with another aspect of the current specification, a wireless local area network is presented. The wireless local area network includes at least one wireless access point and at least one wireless local access network controller. Moreover, the wireless local area network includes at least one client device coupled to the wireless local area network via an uplink and a downlink to the at least one access point, where the client device includes a processor unit and a wireless analytics unit operatively coupled to the processor unit. The wireless analytics unit is configured to receive at least one primary performance parameter corresponding to the wireless local area network for at least one operating interval of the client device uplink to the at least one access point of the wireless local area network, compute at least one derived performance parameter based on the at least one primary performance parameter, analyze trends of the at least one primary performance parameter and the at least one derived performance parameter to identify occurrence of at least one problem signature, define a situational awareness state characterizing the network conditions experienced by the client device based on the at least one problem signature, and identify occurrence of at least one transient fault condition in the wireless local area network based on the situational awareness state.

In accordance with yet another aspect of the present specification, a client device is presented. The client device is coupled to a wireless local area network via an uplink and a downlink to at least one access point. Also, the client device includes a processor unit and a wireless analytics unit operatively coupled to the processor unit. The wireless analytics unit is configured to receive at least one primary performance parameter corresponding to the wireless local area network for at least one operating interval of the client device uplink to the at least one access point of the wireless local area network, compute at least one derived performance parameter based on the at least one primary performance parameter, analyze trends of the at least one primary performance parameter and the at least one derived performance parameter to identify occurrence of at least one problem signature, define a situational awareness state characterizing the wireless local area network conditions experienced by the client device based on the at least one problem signature, and identify occurrence of at least one transient fault condition in the wireless local area network based on the situational awareness state.

DRAWINGS

These and other features and aspects of embodiments of the present specification will become better understood when the following detailed description is read with reference to the accompanying drawings in which like characters represent like parts throughout the drawings, wherein:

FIG. 4 is one embodiment of a lookup table of problem signatures over varying time scales for use in determining situational awareness corresponding to various phases of connectivity of a client device to a WLAN, in accordance with aspects of the present specification;

Figure 7:
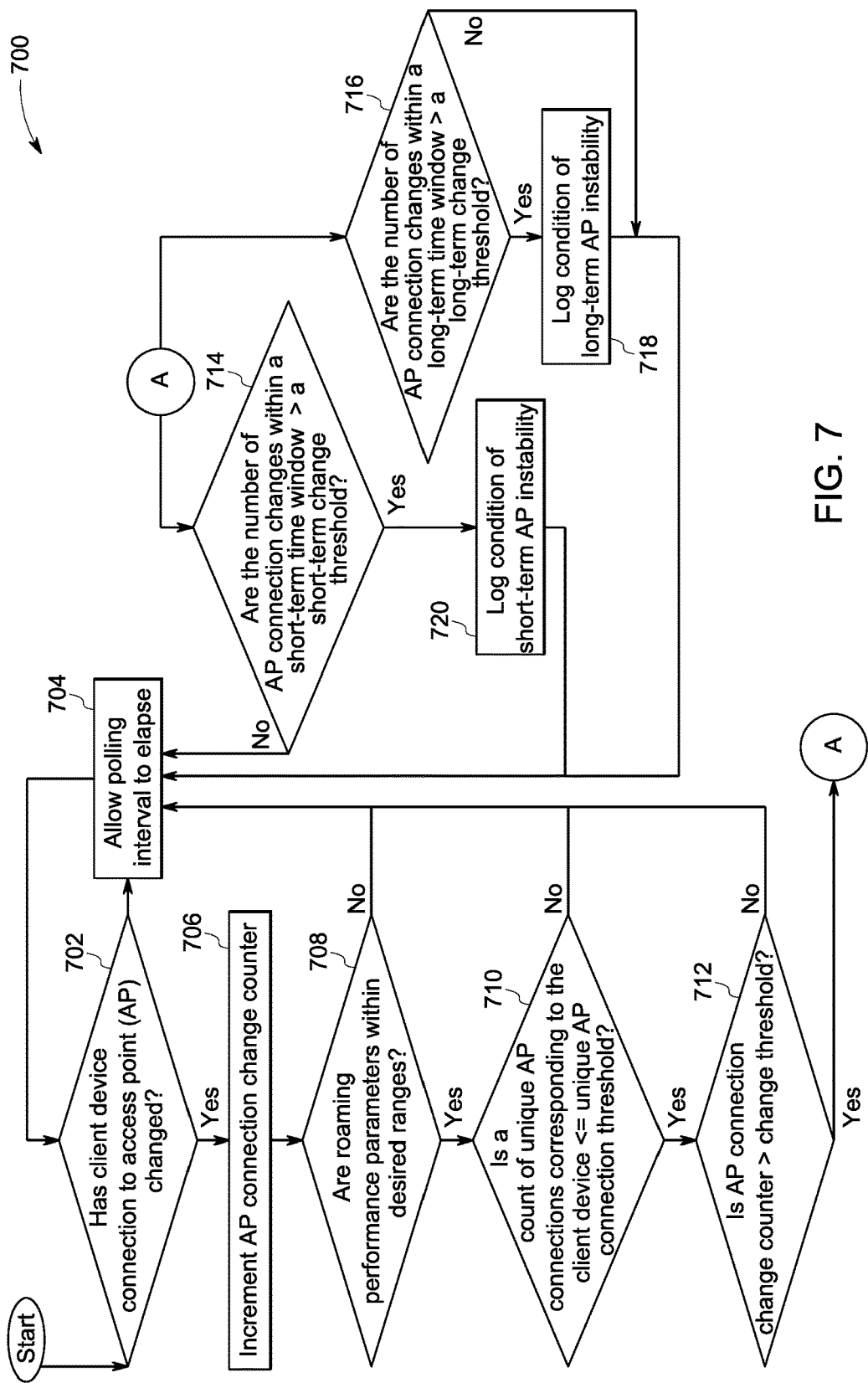
Figure 8:
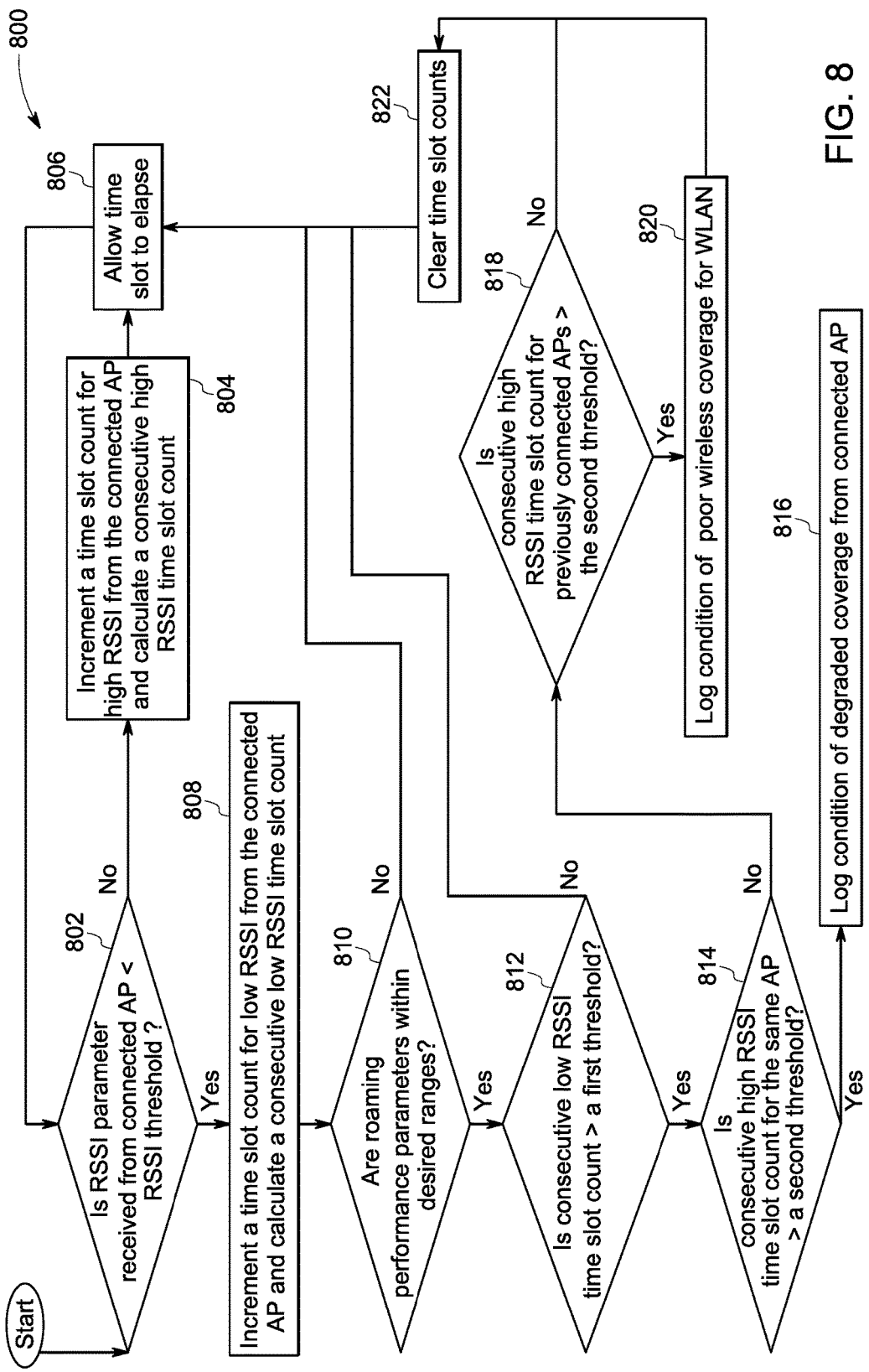

FIG. 7 is a flowchart illustrating a method for evaluating stability of an access point to which a client device is connected, in accordance with aspects of the current specification; and FIG. 8 is a flowchart illustrating a method for evaluating performance degradation of an access point with respect to wireless coverage over varying time scales at a client device, in accordance with aspects of the current specification.

DETAILED DESCRIPTION

As will be described in detail hereinafter, various embodiments of exemplary systems and methods for distributed real-time monitoring and characterization of network conditions in wireless local area networks (WLANs) are presented. In an effort to provide a concise description of these embodiments, all features of an actual implementation may not be described in the specification.

When describing elements of the various embodiments of the present specification the articles "a", "an", "the" and "said" are intended to mean that there are one or more of the elements. The terms "comprising", "including" and "having" are intended to be inclusive and mean that there may be additional elements other than the listed elements.

The terms "network" and "wireless network," "wireless local area network" and "WLAN" may be used interchangeably in the present specification and are used to refer to the wireless local area network as a whole, including the access points, a WLAN controller, and the client devices.

Figure 1:
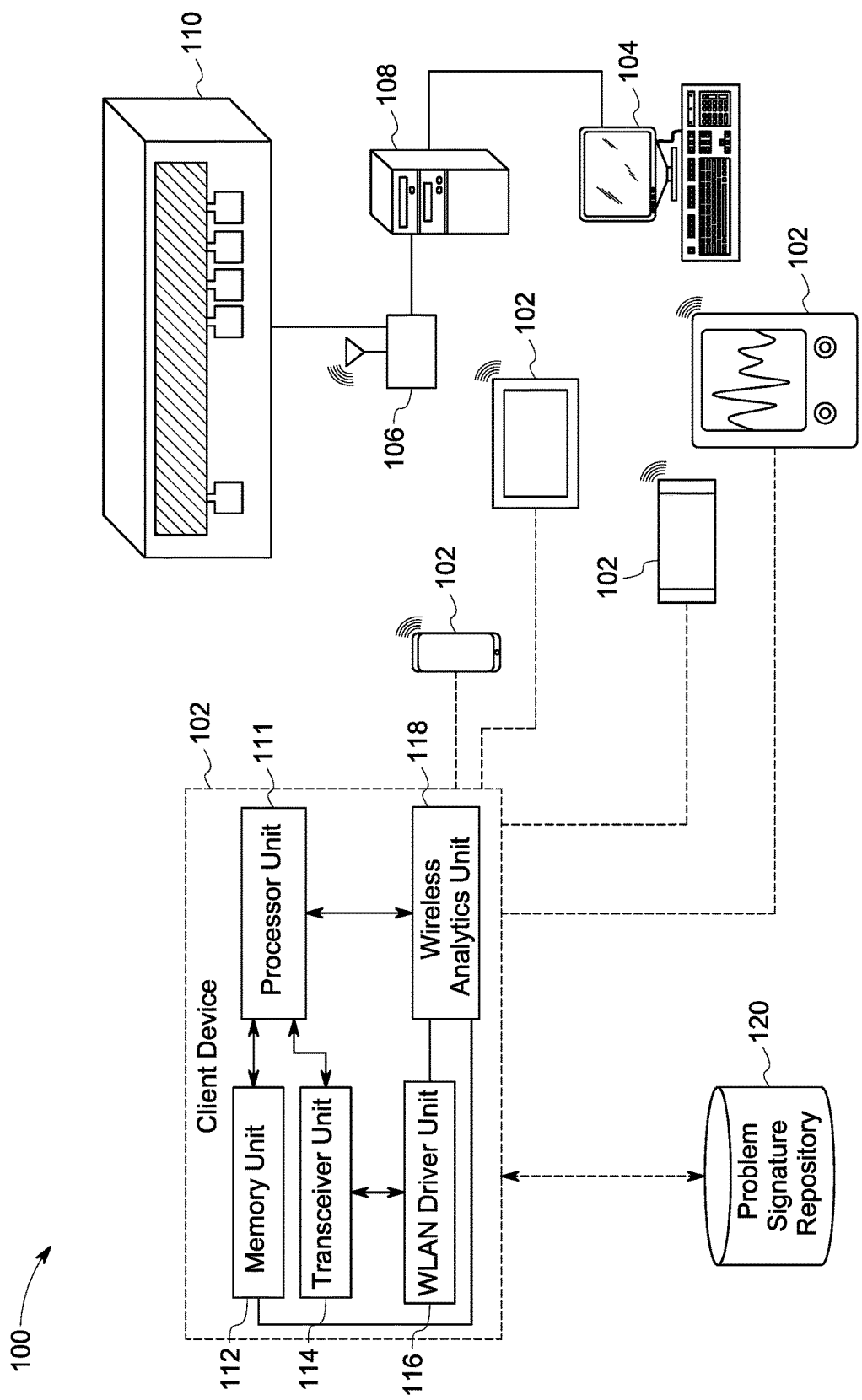
FIG. 1 is a schematic diagram of an exemplary system for real-time monitoring and characterization of network conditions of a WLAN experienced by a client device, in accordance with aspects of the present specification.

An exemplary wireless local area network is illustrated in FIG. 1, in accordance with aspects of the present specification. Reference numeral 100 is generally representative of a wireless local area network (WLAN). In one embodiment, reference numeral 100 may be generally representative of a WLAN in a hospital environment. The WLAN 100 may include one or more client devices 102. In some embodiments, the client devices 102 may include mobile phones, tablets, personal digital assistants (PDAs), laptops, handheld devices, patient monitoring devices, servers, and the like. Additionally, the WLAN 100 may include one or more access points (APs) 106, central patient monitoring stations 104, WLAN servers 108, and WLAN controllers or controller devices 110. The client devices 102 are configured to connect to or join the WLAN 100 by communicatively coupling with one or more APs 106 in the WLAN 100. Moreover, this communicative coupling between the client devices 102 and the APs 106 may include an uplink and/or a downlink. Further, the APs 106 may be communicatively coupled to the WLAN controller 110. Additionally, the APs 106 may be communicatively coupled to one or more servers 108 wirelessly or through a fixed wire network. The servers 108 may be operatively coupled to a central patient monitoring station 104.

In a presently contemplated embodiment, the WLAN 100 may be used in a hospital or a medical center to facilitate wireless communication of medical data from one or more patient monitoring devices to an infrastructure system or servers. In one example, this medical data may be collected in real-time to continuously monitor or analyze the condition of a patient.

The client devices 102 may be disposed on or about one or more patients and/or caregivers or carried by one or more patients and/or caregivers. In the presently contemplated configuration, the WLAN 100 includes one or more APs 106 that are strategically situated at different locations to provide a desired coverage area to the client devices 102. It may be noted that an access point (AP) is typically a wireless networking device that transmits and receives data and manages connection of the one or more client devices 102 in the WLAN 100. Also, in one example, the AP 106 may serve as a point of interconnection between the WLAN 100 and a fixed wire network. Further, each AP 106 may be used to establish wireless communication with the client devices 102 that are within a transmission range of the corresponding AP 106. Also, the client devices 102 may roam freely within the system 100 by transitioning from a current AP to a new AP.

In the presently contemplated configuration of FIG. 1, a client device 102 may include one or more processor units 111, a memory unit 112, one or more transceivers 114, one or more WLAN driver units 116, and one or more wireless analytics units 118. It may be noted that the client device 102 may include other components or hardware, and is not limited to the components shown in FIG. 1. The processor unit 111 is electrically/communicatively coupled to the transceiver 114 and the memory unit 112. Also, the transceiver 114 is electrically/communicatively coupled to the memory unit 112. Further, the processor unit 111 is configured to communicate application data to one or more APs 106 via the transceiver 114. The wireless analytics unit 118 is operatively coupled to the processor unit 111, the memory unit 112, and the transceiver 114. In certain embodiments, the wireless analytics unit 118 may be implemented as software systems or computer instructions executable via one or more processing units 110 and stored in memory unit 112. In other embodiments, the wireless analytics unit 118 may be implemented as a hardware system, for example, via FPGAs, custom chips, integrated circuits (ICs), and the like. In certain embodiments, various steps of methods illustrated in FIGS. 2 through 8 may be performed by the processor unit 111 in conjunction with the memory unit 112, wireless analytics unit 118, transceiver 114, and WLAN driver unit 116. Additionally, the client device 102 may be operatively/communicatively coupled to a problem signature repository 120.

With continuing reference to FIG. 1, the problem signature repository 120 is a data repository configured to store problem signatures of network error conditions of the WLAN 100. A problem signature may be defined as a pattern in a trend of a primary performance parameter of the WLAN or a derived performance parameter of the WLAN over a given time scale corresponding to various stages of connectivity of the client device to the WLAN that most closely characterizes or correlates to a known network error condition experienced by the client device 102. A primary performance parameter may be defined as a measure of a key WLAN performance factor. WLAN performance is an indicator of productivity of a wireless user's connectivity. The primary performance parameters and derived performance parameters are described in greater detail with reference to FIG. 2.

In one embodiment, a trend of a primary performance parameter or derived performance parameter is generally representative of a set of one or more values of the parameter over a given time scale or interval. Some non-limiting examples of the time scale or interval include ranges of 5-60 seconds, 60 seconds—one hour, 0-5 seconds, and the like.

Referring again to the trend, by way of example, the trend may be represented as a value-time curve, wherein the x-axis may represent the time scale or interval and the y-axis may represent one or more values of the parameter obtained during that time interval. Moreover, the parameter values may fall outside value ranges specified in the WLAN quality of service (QoS) specification and/or SLA specifications. These outlier parameter values and/or the parameter values within range of QoS specifications may form a pattern in the trend. More particularly, the occurrence of this pattern may correlate to a known network condition. Accordingly, this pattern may be generally representative of a problem signature of the known network error condition.

In one example, the problem signature repository may include a lookup table of problem signatures over varying time scales corresponding to various phases of connectivity of the client device 102 to the WLAN 100. Other non-limiting examples of problem signatures may include a hash table, graph database, state transition diagram representations, and the like. The problem signature repository 120 will be described in greater detail with reference to FIGS. 3 and 4. These problem signatures may be used by the client device 102 to identify/detect network error conditions.

In one embodiment, the wireless analytics unit 118 in the client device 102 is configured to monitor one or more primary performance parameters of the WLAN 100 over varying real-time scales. Also, the wireless analytics unit 118 computes one or more derived performance parameters based on the one or more primary performance parameters. Additionally, the wireless analytics unit 118 compares the trends of the one or more primary performance parameters and derived performance parameters with one or more problem signatures retrieved from the problem signature repository 120 and determines a situational awareness state of the client device 102. The situational awareness state of the client device 102 characterizes network conditions experienced by the client device 102 over varying time scales. The situational awareness state of the client device 102 will be described in more detail with reference to FIG. 2.

Further, the wireless analytics unit 118 of the client device 102 may log the situational awareness state of the client device 102. The client device 102 may transmit the log of the situational awareness state to one or more APs 106 and/or the WLAN controller 110. The WLAN controller 110 employs the situational awareness state logs to correct/rectify the operation of the WLAN 100 in response to any identified error and warning conditions.

The WLAN 100 presented in FIG. 1 is configured for real-time monitoring and characterization of network conditions experienced by a client device 102 during different levels of operation and occupancy of the WLAN.

Figure 2:
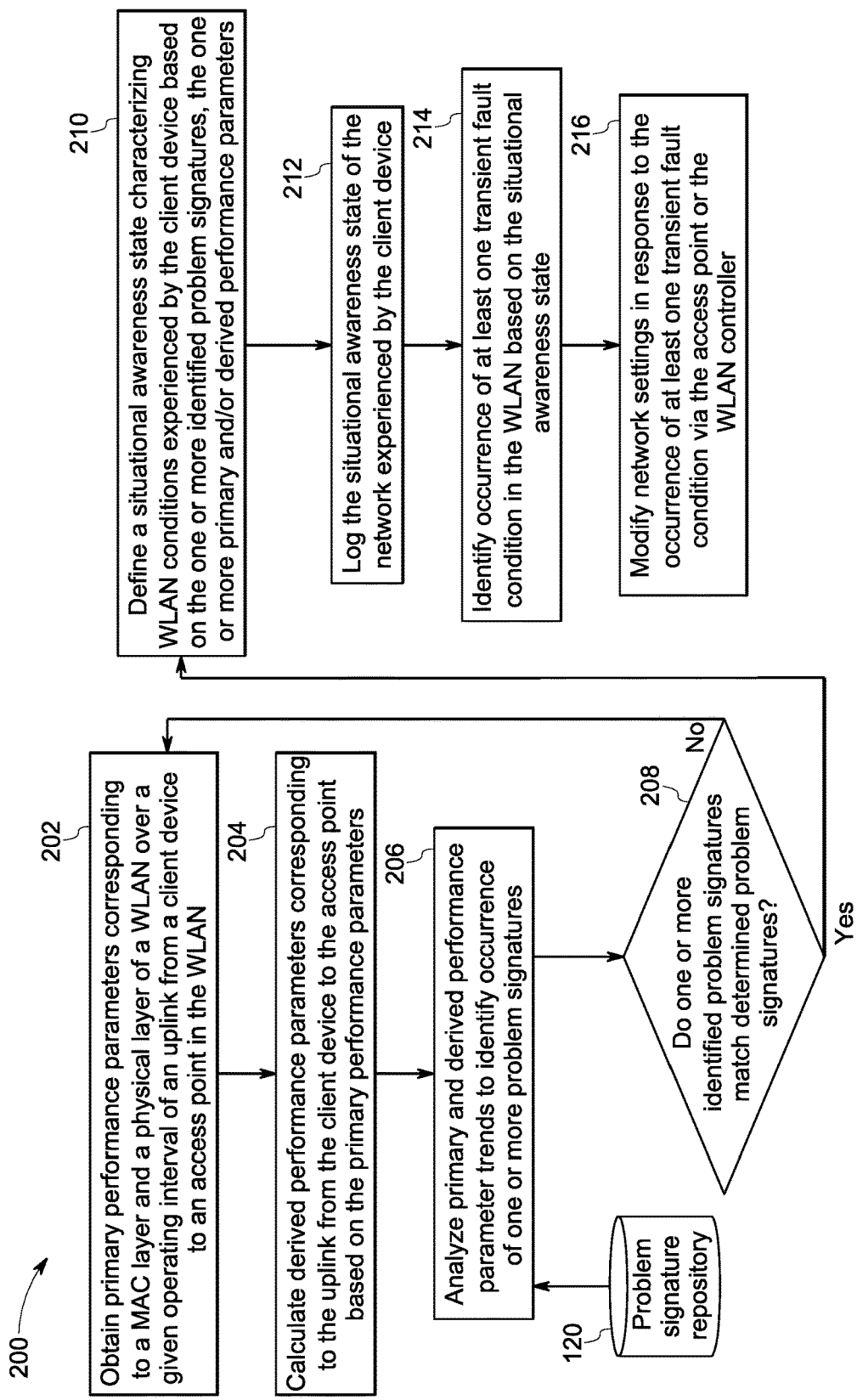
FIG. 2 is a flowchart illustrating a method for real-time monitoring and characterization of network conditions of a WLAN experienced by a client device, in accordance with aspects of the present specification.

Turning now to FIG. 2, a flowchart 200 illustrating a method for real-time monitoring and characterization of network conditions of a WLAN experienced by a client device, in accordance with aspects of the present specification, is presented. The method 200 is described with reference to the components of FIG. 1. It may be noted that flowchart 200 illustrates the main steps of the method for real-time monitoring and characterization of network conditions of the WLAN experienced by the client device 102, and additional inputs and steps will be described in greater detail in FIGS. 3-8. In some embodiments, various steps of the method 200 of FIG. 2, and in particular, steps 202-214 may be performed by one or more processor units 111 in conjunction with the wireless analytics unit 118, WLAN driver unit 116, memory unit 112, and transceiver unit 114. It may be noted that in some embodiments, the method 200 may be performed iteratively over one or more successive operating intervals, typically in the range of 5-60 seconds, or 60 seconds to one hour. In other embodiments, the method 200 may be performed periodically for one or more operating intervals.

As previously noted, the situational awareness state of the client device 102 characterizes the network conditions experienced by the client device 102 over varying time scales. In certain embodiments, the situational awareness state is defined based on one or more primary performance parameters of the WLAN 100, one or more derived performance parameters of the WLAN 100, one or more problem signatures that match the trends of the one or more primary performance parameters and/or derived performance parameters, or combinations thereof. The primary performance parameters may be obtained by the client device 102 from a Media Access Control (MAC) layer and/or other physical layers of the WLAN 100.

Some non-limiting examples of primary performance parameters may include received signal strength (also known as received signal strength indicator (RSSI)), receiver noise, packet latency, data throughput, packet loss percentage, number (count) of co-channel access points, attempts per frame, channel receive ratio, transmit rate, frame send request rate, received frame rate, transmit power, channel active time, beacon interval, or combinations thereof. Derived performance parameters are based on one or more primary performance parameters that are obtained from the WLAN 100. By way of example, the client device switches between access points from time to time. This switch is a primary performance parameter that may be obtained from the WLAN 100. Accordingly, based on these "switching events" an AP change rate may be calculated as a count of observed AP changes in a given unit of time. The AP change rate may be considered to be a derived performance parameter. In a similar fashion, other non-limiting examples of derived performance parameters may include short term AP change rate, long term AP change rate, wireless coverage, AP coverage, or combinations thereof.

With the foregoing in mind, an exemplary situational awareness state may include one or more of one or more problem signatures, one or more primary performance parameters, and one or more derived performance parameters. Some examples of the problem signatures include congestion, co-channel interference, sub-optimal roaming, service level agreement violations, access point instability, or combinations thereof. Further, some examples of the primary performance parameters include received signal strength, receiver noise, packet latency, data throughput, packet loss percentage, number (count) of co-channel access points, attempts per frame, channel receive ratio, transmit rate, frame send request rate, received frame rate, transmit power, channel active time, beacon interval, or combinations thereof. Moreover, some examples of the derived performance parameters include short term AP change rate, long term AP change rate, wireless coverage, AP coverage or combinations thereof. The situational awareness state is generally representative of the network conditions experienced by the client device 102. Furthermore, the situational awareness state characterizes the network conditions experienced by the client device 102 via the one or more problem signatures, primary and derived performance parameters. It may be noted that a more comprehensive non-limiting set of problem signatures of the situational awareness state is depicted in FIG. 4. The problem signatures are described in greater detail with reference to FIG. 4.

The method 200 starts at step 202 where the one or more primary performance parameters corresponding to the WLAN 100 are obtained over a given operating interval of an uplink from a client device 102 to an access point 106 in the WLAN 100. More particularly, the primary performance parameters corresponding to the MAC layer and a physical layer of the WLAN 100 may be obtained. Some non-limiting examples of operating intervals may include intervals of 1-5 seconds, 5-60 seconds, or 60 seconds-one hour.

Further, at step 204, one or more derived performance parameters corresponding to the uplink from client device 102 to the access point 106 may be calculated based on the primary performance parameters obtained at step 202. Additionally, trends associated with the primary and derived performance parameters are analyzed to identify the occurrence of one or more problem signatures, as indicated by step 206. In one embodiment, this analysis includes comparing the trends corresponding to the primary and derived performance parameters to one or more determined problem signatures to identify patterns within the trends that match the one or more problem signatures.

At step 208, a check is carried out to determine if the one or more identified problem signatures match one or more determined problem signatures. In one embodiment, the determined problem signatures may be retrieved from the problem signature database 120. In other embodiments, the determined problem signatures may be uploaded into the client device 102 prior to deploying the client device 102 on the WLAN 100. At step 208, if a match between the identified problem signatures and the determined problem signatures is determined, control passes to step 210. If, however, at step 208 it is determined that there is no match, control passes to step 202.

Turning now to step 210, a situational awareness state of the client device 102 is defined. As previously noted, in some embodiments, the situational awareness state may be defined based on one or more primary performance parameters of the WLAN, one or more derived performance parameters of the WLAN, one or more problem signatures that match the trends of the one or more primary performance parameters and/or the derived performance parameters, or combinations thereof. In certain embodiments, the situational awareness state is recorded or logged, as indicated by step 212.

Referring now to step 214, occurrence of one or more transient fault conditions of the WLAN 100 may be identified based on the situational awareness state of the client device 102. More specifically, the situational awareness state of the client device 102 may be processed via one or more analytic functions to identify the occurrence of one or more transient fault conditions of the WLAN 100. The one or more analytical functions will be described in greater detail with reference to FIGS. 5-8. Additionally, in certain embodiments, the identified transient fault conditions may be recorded or logged on the client device 102. The log data may be communicated to a network administrator of the WLAN 100 or a monitoring device configured to monitor/analyze the log data. Moreover, the log data may be employed as a diagnostic tool to facilitate any corrective action. In one non-limiting example, the corrective action may entail modification of the network settings of the WLAN 100, as indicated by step 216. Some non-limiting examples of network settings may include scan threshold, switch threshold, short scan duration, long scan duration, preferred access points, and the like. In one embodiment, one or more client devices 102 operating in different wireless coverage areas of the WLAN 100 may transmit the corresponding logs of the situational awareness state and the transient fault conditions identified by the one or more analytical functions over the given operating interval to the WLAN controller 110. The network administrator may employ the WLAN controller 110 to modify the network settings of the WLAN 100 and/or one or more APs 106 in response to the logs received from the one or more client devices 102. It may be noted that in some embodiments, steps 202-214 of the method 200 are generally representative of steps performed to determine the situational awareness state of the client device 102 and may be iterated over subsequent operating intervals.

Figure 3:
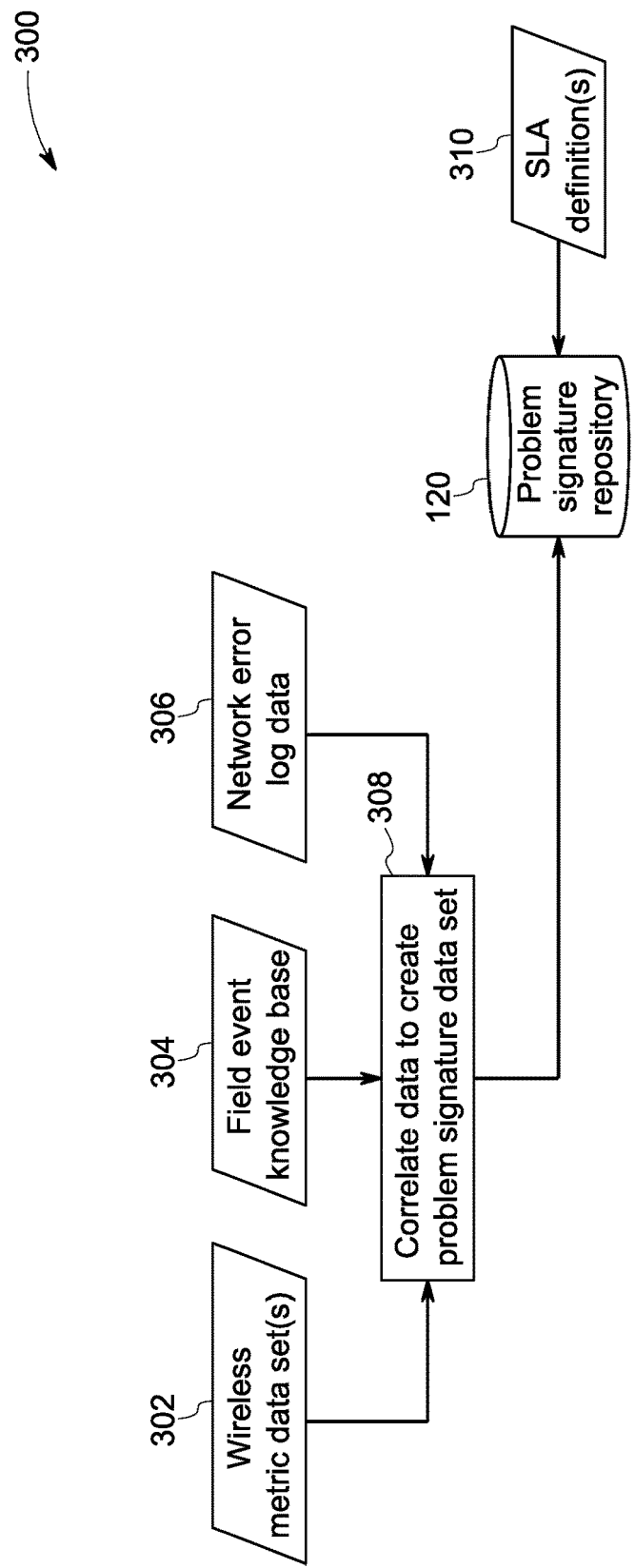
FIG. 3 is a flowchart illustrating a method for creating a problem signature repository, in accordance with aspects of the present specification.

Turning now to FIG. 3, a flowchart 300 illustrating a method for creating a problem signature repository, in accordance with aspects of the present specification, is presented. The problem signature repository corresponds to the problem signature repository 120 of FIG. 1. The method 300 is described with reference to the components of FIG. 1. In certain embodiments, various steps of the flowchart 300 may be performed at an offline (not shown) server. In other embodiments, the steps of the flowchart 300 may be performed at the WLAN servers 108.

The method 300 starts at step 308 where, in one embodiment, wireless metric data sets 302, field event knowledge bases 304, network error log data 306, or combinations thereof are correlated to create a problem signature data set.

The wireless metric data sets 302 may be generally representative of one or more primary or derived performance parameters and their corresponding value ranges specified in WLAN QoS specifications and/or SLA specifications. Moreover, the field event knowledge bases 304 may be generally representative of historical data corresponding to one or more network fault or error conditions. Additionally, the network error log data 306 may be generally representative of log data corresponding to one or more network fault or error conditions. In certain embodiments, the correlation may be performed by a domain expert or field service personnel. In other embodiments, the correlation may be automated based on the wireless metric data sets 302, the field event knowledge bases 304, and/or network error log data 306. The problem signature data set is stored in the problem signature repository 120.

The problem signature repository 120 may also include service level agreement (SLA) definitions 310. As previously noted, device manufacturers of the client devices 102 typically enter a SLA with WLAN providers to stipulate a minimal level of service that the WLAN 100 must provide to the client device 102. Accordingly, the SLA definitions 310 may include stipulated operating ranges for one or more key performance metrics. The SLA definitions will be described in greater detail with reference to FIG. 5.

FIG. 4 is one example 400 of a lookup table of problem signatures over varying time scales for use in determining a situational awareness state corresponding to various phases of connectivity of a client device to the WLAN, in accordance with aspects of the present specification. The lookup table 400 is described with reference to the components of FIG. 1.

In the exemplary lookup table 400, rows R1, R2, and R3 may be generally indicative of a wireless connection phase between the client device 102 and an AP 106. For example, the connection phases may include an initial association phase, a steady state phase, and a roaming and mobility phase. Additionally, columns C1, C2, C3, and C4 are generally indicative of a time frame or time interval corresponding to the connection phases of rows R1, R2, and R3. The table cell values corresponding to the intersection of the rows R1, R2, and R3 and columns C1, C2, C3, and C4 of the lookup table 400 are generally representative of network fault condition occurrences that correspond to the connection phase indicated by the rows R1, R2, and R3 and the time intervals indicated by columns C1, C2, C3, and C4. For example, the table cell "Co-channel interference," corresponding to row R2, column C1 may be generally representative of a network fault condition of co-channel interference occurring in the steady state phase of the connection between the client device 102 and the AP 106, in a time interval of 0-5 seconds. In another example, the table cell "Receiver overload—broadcast storm or network loop," corresponding to row R2, and columns C2-C3 may be generally indicative of a network fault condition of a receiver overload due to a broadcast storm or a network loop in the steady state phase of the connection between the client device 102 and the AP 106 in a time interval ranging from 5 seconds to 60 seconds. It may be noted that each table cell value may also be correlated with one or more primary and/or derived performance parameters (not shown).

In a similar fashion, other network fault conditions may be identified and added to the lookup table 400. It may be noted that other data models of problem signatures may also be used to create the problem signature repository 120 including graph models, state representations and the like.

As previously noted with reference to step 214 of FIG. 2, the situational awareness state of the client device 102 is processed via one or more analytic functions to identify one or more transient fault conditions of the WLAN 100. FIGS. 5-8 present use of different analytical functions to identify the occurrence of various transient fault or error conditions of the WLAN 100 experienced by the client device 102 based on further analysis of the situational awareness state of the client device 102.

Figure 5:
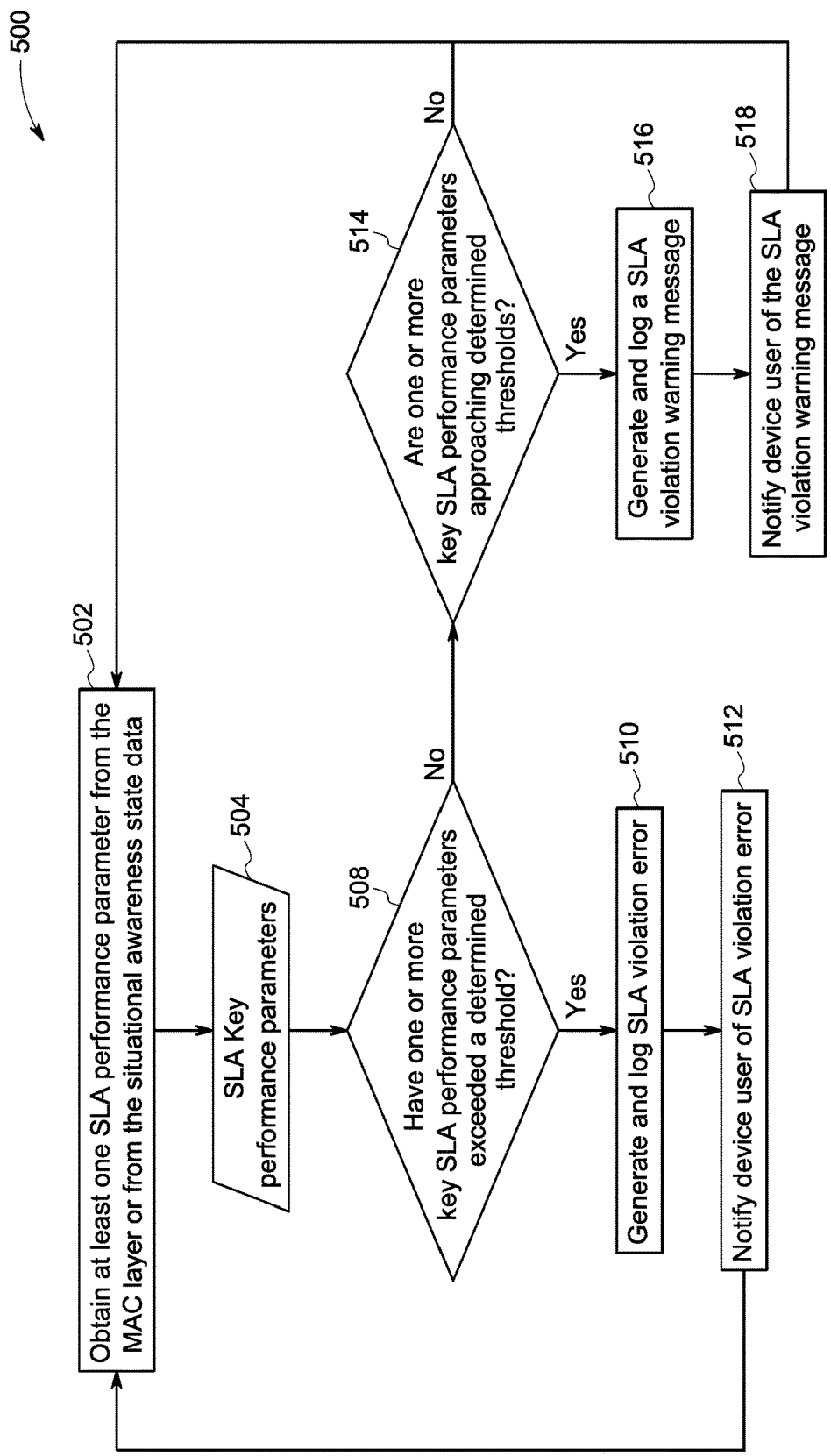
FIG. 5 is a flowchart illustrating a method for detecting violations of a service level agreement of a WLAN at a client device, in accordance with aspects of the present specification.

Turning now to FIG. 5, a flowchart 500 illustrating a method for identifying an occurrence of a transient fault condition of the WLAN experienced by the client device 102, based on the situational awareness state of the client device 102, in accordance with aspects of the present specification, is presented. More particularly, the method 500 is representative of a method for detecting violations of a service level agreement of a WLAN at a client device. The method 500 is described with reference to the components of FIGS. 1 and 2. In some embodiments, steps 502-518 of the method 500 may be performed by one or more processor units 111 in conjunction with the wireless analytics unit 118, WLAN driver unit 116, memory unit 112, and transceiver unit 114. It may be noted that in some embodiments, the method 500 may be performed continuously as a background process. In other embodiments, the method 500 may be performed periodically over one or more successive operating intervals. The operating intervals may be typically in the range of 1-5 seconds, 5-60 seconds, 60 seconds-one hour.

The method 500 starts at step 502 where data corresponding to at least one SLA performance parameter is obtained. As previously noted, service level agreements stipulate operating ranges of one or more key network performance parameters. Some non-limiting examples of key network performance parameters under SLAs may include data throughput, packet latency, and packet loss percentage. In one example, data throughput may be determined by an amount of data that is successfully transmitted in a fixed interval of time. In other examples, packet loss percentage may be determined by a percentage of packets that are unacknowledged by the receiver after exhausting all retransmission attempts. Also, packet latency or latency per packet may be determined by recording a time duration between an instant a packet is listed in a MAC queue and an instant an acknowledgement for that packet is received from the AP. The data corresponding to the one or more SLA performance parameters may be received from the MAC layer or from the situational awareness state data. Reference numeral 504 is generally representative of the SLA key performance parameters.

At step 508, a check is carried out to determine if one or more key SLA performance parameters 504 have exceeded a corresponding determined threshold. It may be noted that the one or more corresponding determined thresholds may be defined within the SLA. If, at step 508, it is determined that one or more key SLA performance parameters 504 have exceeded the corresponding determined thresholds, control passes to step 510. However, if at step 508 it is determined that the one or more key SLA performance parameters 504 have not exceeded the corresponding determined thresholds, control passes to step 514.

Referring now to step 510, an SLA violation error message is generated and logged at the client device 102. Moreover, an SLA violation error message may be displayed on the display unit (not shown) of the client device 102 to notify the user of the client device 102, as indicated by step 512. Subsequently, control passes back to step 502 of the method 500.

Turning now to step 514, a check is carried out to determine whether one or more key SLA performance parameters 514 are approaching the corresponding determined thresholds. In some embodiments, if one or more key SLA performance parameters 504 are within a determined margin of the corresponding determined thresholds, the condition for "approaching" the determined threshold may be considered satisfied. In one example, the determined margin may include a range within 1% of the determined threshold. In one embodiment, the determined margin may be obtained from network configuration settings at the client device 102. If at step 514, it is determined that the one or more key SLA performance parameters 504 are approaching the corresponding determined thresholds, control passes to step 516. However, if at step 514 it is determined that the one or more key SLA performance parameters 504 are not approaching the corresponding determined thresholds, control passes back to step 502 and the method 500 is iterated over the given operating interval.

Subsequently, at step 516, a SLA violation warning message is generated and logged at the client device 102. Moreover, an SLA violation warning message may be displayed on the display unit (not shown) of the client device 102 to notify the user of the client device 102, as indicated by step 518. Subsequently, control passes back to step 502 wherein the method 500 is iterated over the given operating interval.

Figure 6:
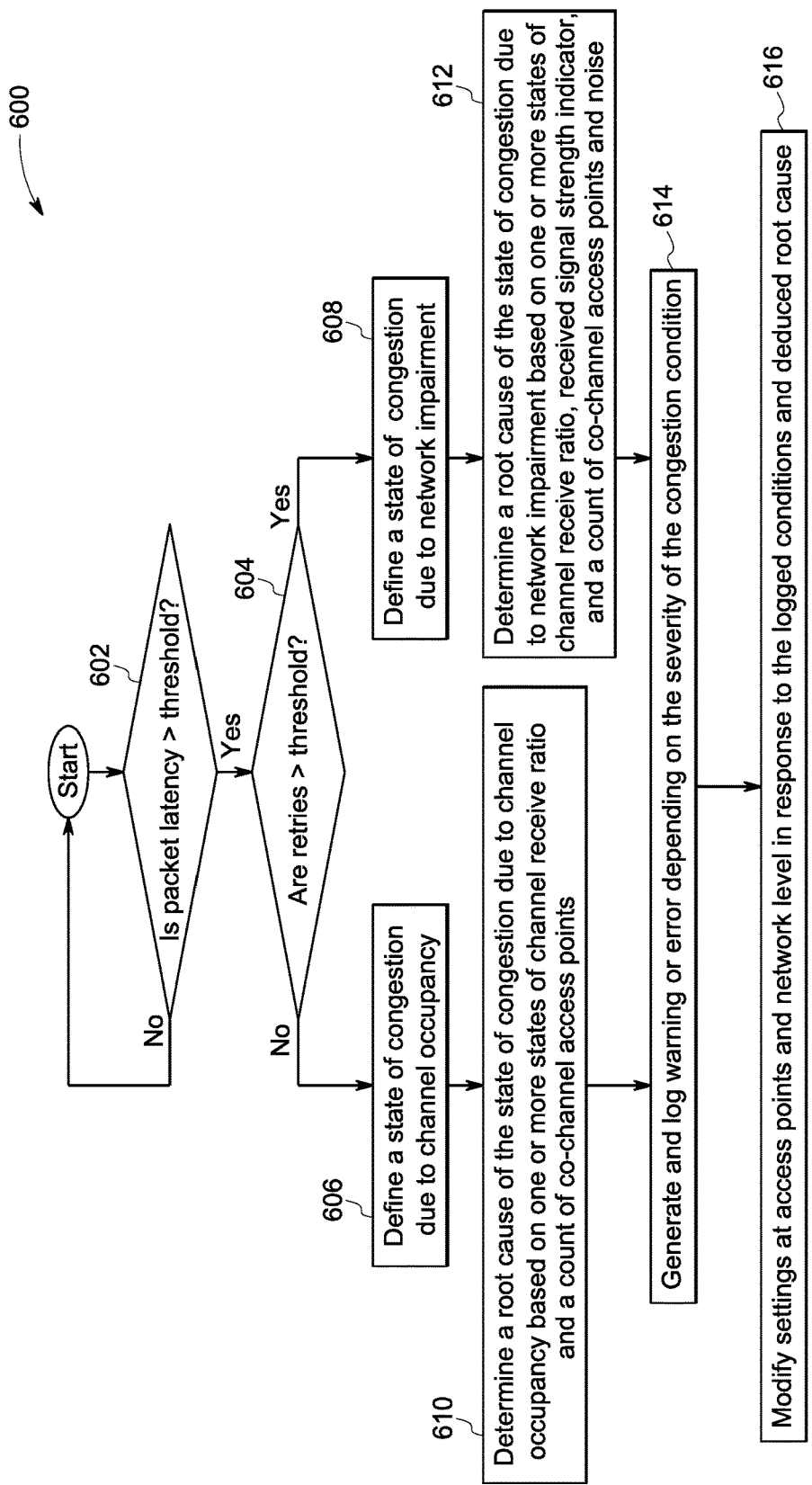
FIG. 6 is a flowchart illustrating a method for evaluating congestion conditions of a WLAN within a service area of a client device, in accordance with aspects of the current specification.

It may be noted that one of the problems often experienced by client devices 102 in a hospital WLAN 100 is congestion. The network may get congested due to a variety of reasons and may be unable to meet the requirements of wireless patient monitoring and telemetry. In FIG. 6, a flowchart 600 illustrating another method for identifying an occurrence of a transient fault condition of the WLAN experienced by the client device 102, based on a situational awareness state of the client device 102, in accordance with aspects of the present specification, is presented. More particularly, the method 600 is representative of a method for evaluating congestion conditions of a WLAN within a service area of a client device. The method 600 is described with reference to FIGS. 1 and 2.

It may be noted that flowchart 600 is generally representative of one example of step 214 of the method 200. In some embodiments, various steps of the method 600 of FIG. 6, in particular, steps 602-614 may be performed by one or more processor units 111 in conjunction with the wireless analytics unit 118, WLAN driver unit 116, memory unit 112, and transceiver unit 114. It may be noted that in some embodiments, the method 600 may be performed iteratively over one or more successive operating intervals, typically in the range of 5-60 seconds, or 60 seconds to one hour. In other embodiments, the method 600 may be performed periodically for one or more operating intervals. Moreover, in certain embodiments, the method 600 detects onset of congestion, congestion failure, and a cause related to the congestion condition in the WLAN. More particularly, the congestion condition is detected based on packet latency, number of retransmissions per packet, received signal strength indicator, channel noise, count of co-channel access points, channel receive ratio, or combinations thereof.

The method 600 starts at step 602, wherein a check is carried out to determine whether packet latency is greater than a first determined threshold. As will be appreciated, the packet latency is generally representative of the time duration between an instant a packet is listed in a MAC queue and an instant an acknowledgement for that packet is received from the AP 106. Accordingly, the situation where the packet latency is greater than the first determined threshold, may be generally indicative of a congestion condition. In some embodiments, the first determined threshold may be obtained from network configuration settings uploaded on the client device 102 prior to joining the WLAN 100. The method 600 loops at step 602 until the packet latency is greater than the first determined threshold, which may indicate the occurrence of a congestion condition. Accordingly, at step 602, if it is determined that the packet latency is greater than the first determined threshold, control passes to step 604.

Furthermore, at step 604, another check is carried out to determine if a count of retransmissions per packet ("retries") is greater than a second determined threshold. In some embodiments, the second determined threshold may be obtained from network configuration settings uploaded on the client device 102 prior to joining the WLAN 100. If at step 604, it is determined that the retries are lower than the second determined threshold, control passes to step 606, a congestion state due to network impairment is defined/identified.

Subsequent to step 606, a root cause of the congestion state due to channel occupancy is determined, as indicated by step 610. In one embodiment, the root cause for the congestion state may be determined based on combinations of states of a channel receive ratio parameter and a parameter representing a count of co-channel APs. As will be appreciated, co-channel interference occurs between two or more APs that are on the same frequency channel. Typically, in Wi-Fi deployment, frequency channels are reused when deploying APs. Accordingly, a record of the count of APs using the same frequency channel may be maintained at the WLAN configuration level. In one embodiment, the channel receive ratio parameter may be in one of two states: "In-spec" or "Out-of-spec." In a similar fashion, the count of co-channel APs parameter may be in one of two states: "In-spec" or "Out-of-spec." Accordingly, the root cause of the congestion state due to channel occupancy may be defined as one of four possible states based on the combination of the states of the channel receive ratio parameter and the number of co-channel APs parameter. Control is subsequently passed to step 614.

Referring again to step 604, if it is determined that the retries are greater than the second determined threshold, control passes to step 608, where a congestion state due to channel occupancy is defined/identified. Subsequently, a root cause of the congestion state due to network impairment is determined, as indicated by step 612. In one embodiment, the root cause for the congestion state may be determined based on combinations of states of the channel receive ratio parameter, received signal strength indicator parameter, a number of co-channel APs parameter, and a noise parameter. Also, in one embodiment, the channel receive ratio may be in one of two states: "In-spec" or "Out-of-spec," and the number of co-channel APs may also be in one of two states: "In-spec" or" Out-of-spec." Moreover, the received signal strength indicator parameter may be in one of three states: "In-spec," "Out-of-spec 1," or "Out-of-spec 2." Furthermore, the noise parameter may be in one of three states: "In-spec," "Out-of-spec 1," or "Out-of-spec 2." Accordingly, the root cause of the state of congestion due to network may be defined as one of 36 possible states based on the combination of the states of the channel receive ratio parameter, number of co-channel APs parameter, received signal strength indicator parameter, and the noise parameter. Control subsequently passes to step 614.

Referring now to step 614, warning or error messages depending on the severity of the congestion state/condition determined at steps 610, 608 are generated and logged at the client device 102. Also, the root cause and the corresponding parameter states may be logged at the client device 102. Moreover, based on the logged root cause and the corresponding parameter states, it may be desirable to take corrective actions. Accordingly, at step 616, settings at the APs 106 and the network/WLAN level may be modified. In certain embodiments, a network administrator of the WLAN may modify the WLAN settings via the WLAN controller 110 in response to the logged conditions and/or determined root causes. Alternatively, the WLAN settings may be automatically modified.

When a client device 102 is connected to the WLAN 100 via an AP 106, basic connectivity statistics of the AP 106 may be obtained. Some non-limiting examples of basic connectivity statistics include the received signal strength indicator parameter, AP MAC address, packets sent/received, and the like. The basic connectivity statistics provide a view of the wireless link quality of the data stream between the AP 106 and the client device 102. However, it is advantageous to evaluate the quality of the wireless coverage of the WLAN 100 to which the client device 102 is connected, to determine if the client device 106 is experiencing transient faults in networking conditions due to issues of wireless coverage and network infrastructure. More particularly, it is desirable to evaluate wireless coverage conditions of the one or more APs 106 of the WLAN 100 at the client device level.

With the foregoing in mind, in accordance with aspects of the present specification, the client device 102 is configured to monitor four scenarios, such as short term AP instability, long term AP instability, poor AP coverage, and poor wireless coverage. The monitoring and characterization of the AP stability, AP coverage, and poor wireless coverage experienced by the client device 102 will be described in detail with reference to FIGS. 7 and 8.

Turning now to FIG. 7, a flowchart 700 illustrating yet another method for identifying an occurrence of a transient fault condition of the WLAN experienced by the client device 102, based on a situational awareness state of the client device 102, in accordance with aspects of the present specification, is presented. More particularly, the method 700 is representative of a method for evaluating the stability of an access point to which a client device is connected. The method 700 is described with reference to FIGS. 1 and 2.

In some embodiments, steps 702-720 of the method 700 of FIG. 7 may be performed by one or more processor units 111 in conjunction with the wireless analytics unit 118, WLAN driver unit 116, memory unit 112, and transceiver unit 114. It may be noted that in some embodiments, the method 700 may be performed iteratively over one or more successive operating intervals, typically in the range of 5 seconds to one hour. In other embodiments, the method 700 may be performed periodically for one or more operating intervals. Moreover, the operating interval may be further subdivided into one or more polling intervals.

The method 700 starts at step 702, wherein a check is carried out to determine if a connection of a client device 102 to an AP 106 has changed from a previous polling interval. It may be noted that the polling interval is a sub-interval of the operating interval and is typically in the range of 1 to 5 seconds. At step 702, if it is determined that the connection of the client device 102 to the AP 106 has not changed, control passes to step 704. At step 704, the polling interval elapses, and control returns to step 702. However, if at step 702, it is determined that the client device 102 connection to the AP 106 has changed, then control passes to step 706, where an AP connection change counter is incremented.

Subsequently at step 708, another check is carried out to determine whether roaming performance parameters are within specified/desired ranges. Roaming performance parameters are generally indicative of one or more primary performance parameters and/or derived performance parameters that are monitored to evaluate roaming conditions experienced by the client device 102. Client devices 102 may roam freely within the WLAN coverage area by transitioning their connectivity between different APs 106. The check at step 708 aids in eliminating/minimizing the possibility of roaming issues being the cause of AP instability. Some non-limiting examples of roaming performance parameters include received signal strength indicator (RSSI), data latency, data loss of the application data communicated to a corresponding AP, packet retransmission, and the like. If at step 708, it is determined that the roaming performance parameters are not within the desired ranges, control passes to step 704. However, if at step 708, it is determined that roaming performance parameters are within the desired ranges, control passes to step 710.

At step 710, yet another check is carried out to determine a number of unique AP connections made by the client device 102 or corresponding to the client device 102. More specifically, the check is carried out to determine if a number of unique APs 106 that the client device 102 connected to since the beginning of the operating interval of the method 700 is less than a unique AP connection threshold. A number less than the unique AP connection threshold may generally be indicative of the client device 102 frequently switching between a small set of APs 106, in turn indicating the possibility of an unstable AP. Alternatively, the condition where the number of unique APs to which the client device 102 connected to from the beginning of the operating interval of the method 700 is greater than the unique AP connection threshold may generally be indicative of a scenario where the user is ambulatory through a wider coverage area. For example, the user may be moving through a hallway or going from one building to another building. In one embodiment, the unique AP connection threshold may be obtained from network configuration settings uploaded at the AP 106. Accordingly, if at step 710, it is determined that the number of unique AP connections made by the client device 102 during the operating interval of the method 700 is less than or equal to the unique AP connection threshold, control passes to step 704. However, if at step 710, it is determined that the number of unique AP connections made by the client device 102 during the operating interval of the method 700 is greater than the unique AP connection threshold, control passes to step 712.

Subsequently, at step 712, a check is carried out to determine if the AP connection change counter is greater than a determined change threshold. In one embodiment, the determined change threshold may be obtained from network configuration settings uploaded on the client device 102 prior to joining the WLAN 100. If, at step 712, it is determined that the AP connection change counter is less than or equal to the determined change threshold, control passes back to step 704. However, if at step 712, it is determined that the AP connection change counter is greater than the determined change threshold, control passes to step 714 and step 716. In FIG. 7, the flowchart 700 illustrates an embodiment where steps 714 and 716 are performed simultaneously or in parallel. In alternative embodiments, steps 714 and 716 may be performed sequentially. It may be noted that steps 714 and 716 are not mutually exclusive. Accordingly, regardless of the order of execution, both steps 714 and 716 are performed in embodiment of method 700.

Short term instability or long term instability of an AP 106 may be characterized by the number of changes in connection to APs 106 made by the client device 102 over different time windows. Typically, more than two AP changes by the client device 102 in a short-term time window of around one minute may be disruptive to data communication, and thus, generally indicative of a fault condition experienced by the client device 102 during that particular time window. In a similar fashion, a long-term window may be defined as typically one order of magnitude greater than the short-term window, for example an hour. With respect to long-term time windows, the total number of changes in connection to APs 106 made by the client device 102 may be indicative of a long-term fault condition experienced by the client device 102 over that particular long-term time window. Moreover, this long-term fault condition may not be identifiable within the short-term time window.

By way of example, when a client device 102 switches between APs 106 occasionally, the number of AP changes in the short-term time window may be within desired ranges, for example, one AP change in one minute. However, if over several short-term time windows, the client device 102 continues to switch between APs 106, the client device 102 may experience disruption in communication and/or data loss, despite short-term connection changes to APs 106 being within desired ranges. It is desirable therefore, to identify the occurrence of a second problem signature over a longer duration, for example, one hour to determine a corresponding long-term fault condition.

With the foregoing in mind, turning now to step 714, a further check is carried out to determine the number of AP connection changes occurring within a short-term time window, for example, between 5 to 60 seconds. In one embodiment, the short-term time window and a corresponding short-term change threshold of the desired number of AP connection changes within the short-term time window may be obtained from network configuration settings uploaded on the client device 102 prior to joining the WLAN 100. If, at step 714, it is determined that the number of AP connection changes occurring within the short-term time window is greater than the short-term change threshold, control passes to step 720, where a condition of short-term AP instability is logged at the client device 102. Control subsequently passes back to step 704. However, if at step 714, it is determined that the number of AP connection changes occurring within the short-term time window is less than the short-term change threshold, control passes back to step 704.

Turning now to step 716, an additional check is carried out to determine the number of AP connection changes occurring within a long-term time window, for example, one hour. In one embodiment, the long-term time window and a corresponding long-term change threshold of the desired number of AP connection changes within the long-term time window may be obtained from network configuration settings uploaded on the client device 102 prior to joining the WLAN 100. If, at step 716, it is determined that the number of AP connection changes occurring within the long-term time window is greater than the long-term change threshold, control passes to step 718, where a condition of long-term AP instability is logged at the client device 102. Control subsequently passes back to step 704. However, if at step 716, it is determined that the number of AP connection changes occurring within the long-term time window is less than the long-term change threshold, control passes to back to step 704.

FIG. 8 is a flow chart 800 illustrating yet another method for identifying an occurrence of a transient fault condition of the WLAN 100 experienced by the client device 102, based on a situational awareness state of the client device 102, in accordance with aspects of the present specification. More particularly, the method 800 is representative of a method for evaluating performance degradation of a connected AP with respect to wireless coverage over varying time scales at a client device 102. The method 800 is described with reference to FIGS. 1 and 2.

In some embodiments, steps 802-822 of the method 800 may be performed by one or more processor units 111 in conjunction with the wireless analytics unit 118, WLAN driver unit 116, memory unit 112 and transceiver unit 114. It may be noted that in certain embodiments, the method 800 may be performed iteratively over one or more successive operating intervals, typically in the range of 5 seconds to one hour. In other embodiments, the method 800 may be performed periodically for one or more operating intervals.

The method 800 starts at step 802, where a check is carried out to determine whether a received signal strength indicator (RSSI) parameter received from a connected AP 106 is less than a determined RSSI threshold for a given time slot of the operating interval, for example, 5 seconds. If at step 802 it is determined that the RSSI parameter received from the connected AP 106 is greater than a determined RSSI threshold, control passes to step 804, where a time slot count for a high RSSI parameter received from the connected AP 106 is incremented. It may be noted that due to the transient nature of the RSSI parameter, it is desirable to identify a number of consecutive time slots where the RSSI parameter is greater than the determined RSSI threshold, in order to filter out cases where the RSSI parameter is greater than or less than the corresponding high or low RSSI thresholds for only a single time slot. Accordingly, at step 804, a count of consecutive time slots where the RSSI parameter is greater than the determined threshold is calculated/determined as a consecutive high RSSI time slot count.

Subsequently, at step 806, the time slot is allowed to elapse and control returns to step 802. In one embodiment, the determined RSSI threshold may be obtained from network configuration settings uploaded on the client device 102 prior to joining the WLAN 100. Referring again to step 802, if it is determined that the RSSI parameter received from the connected AP 106 is less than the determined RSSI threshold, control passes to step 808, where a time slot count for a low RSSI received from the connected AP 106 is incremented. As described with reference to step 804, in a similar fashion, the count of consecutive time slots wherein the RSSI parameter is less than the determined threshold is calculated/determined as a consecutive low RSSI time slot count.

Moreover, at step 810, another check is carried out to determine whether roaming performance parameters are within desired ranges. This step aids in minimizing/eliminating the possibility of roaming issues being the cause of AP instability. If at step 810 it is determined that roaming performance parameters are not within the desired ranges, control passes to step 806. However, if at step 810 it is determined that roaming performance parameters are within the desired ranges, control passes to step 812.

Additionally, at step 812, another check is carried out to determine whether the consecutive low RSSI time slot count is greater than a first determined threshold. In one embodiment, the first threshold may be obtained from network configuration settings uploaded at the client device 102. If, at step 812, it is determined that the consecutive low RSSI time slot count is less than or equal to the first determined threshold, control passes to step 806. However, if at step 812, it determined that the consecutive low RSSI time slot count is greater than the first determined threshold, control passes to step 814.

Furthermore, at step 814, a check is carried out to determine if the consecutive RSSI time slot count for the same connected AP 106 is greater than a second determined threshold. In one embodiment, the second determined threshold may be obtained from network configuration settings uploaded on the client device 102 prior to joining the WLAN 100. If, at step 814, it is determined that the consecutive high RSSI time slot count for the same connected AP 106 is greater than the second pre-determined threshold, control passes to step 816, where a performance degradation condition of degraded coverage for the connected AP 106 is logged at the client device 102. Subsequently, control passes to step 822, where the consecutive time slot counts for low RSSI and high RSSI are cleared. Control then passes back to step 806.

With returning reference to step 814, if it is determined that the consecutive high RSSI time slot count for the same connected AP 106 is less than or equal to the second determined threshold, control passes to step 818, where a check is carried out to determine whether a consecutive high RSSI time slot count for APs 106 previously connected to the client device 102 is greater than the second determined threshold. In one embodiment, the consecutive high RSSI time slot count for previously connected APs 106 may be retrieved from the client device logs.

If, at step 818, it is determined that the consecutive high RSSI time slot count for the previously connected APs 106 is greater than the second determined threshold, control passes to step 820, where a performance degradation condition of poor wireless coverage for the WLAN 100 is logged at the client device 102. Subsequently, control passes to step 822, where the consecutive time slot counts for low RSSI and high RSSI are cleared. Control then passes back to step 806.

However, if at step 818, it is determined that the high RSSI time slot count for the previously connected APs 106 is less than or equal to the second determined threshold, control passes to step 822, where the time slot counts for low RSSI and high RSSI are cleared. Control then passes back to step 806.

The systems and methods for real-time monitoring and characterization of network conditions experienced by a client device in a WLAN presented hereinabove provide an enhanced monitoring and characterization of network conditions during different levels of operation and occupancy of the WLAN. Advantageously, the systems and methods perform wireless analytics using real-time data gathered at each operating client device. The client devices may self-monitor and characterize network conditions with respect to service level agreements and other performance issues in a real-time operating environment. Furthermore, aggregating these characterized networked conditions from client devices at different coverage areas of the WLAN enhances the detection of transient network performance issues and provides a more accurate diagnostic view of the state of the network. Additionally, the systems and methods are also configured to modify the settings at the APs and/or at the network level to mitigate Moreover, the systems and methods may be implemented in/retrofit to existing client devices and access points, thereby leveraging the existing WLAN. This arrangement obviates the need for any additional hardware and/or expenditure at the access point or WLAN controller. The systems and methods facilitate computationally simple analytics in real-time using minimal changes to WLAN drivers and software on the client devices. Furthermore, the systems and methods are self-learning and over time are capable of characterizing and learning about additional network conditions and possible outcomes. In particular, these systems and methods obviate the need for any significant engineering effort.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some of or all the steps described herein in different orders or substantially concurrently, that is, in parallel. Additionally, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method for real-time monitoring and characterization of network conditions experienced by a client device coupled to a wireless local area network via an uplink and a downlink to at least one access point of the wireless local area network, the method comprising:
 receiving at least one primary performance parameter corresponding to the wireless local area network for at least one operating interval of the client device uplink to the at least one access point of the wireless local area network;
computing at least one derived performance parameter based on the at least one primary performance parameter;
analyzing one or more trends of the at least one primary performance parameter and the at least one derived performance parameter to identify occurrence of at least one problem signature representative of a known network error condition experienced by the client device;
defining a situational awareness state characterizing the network conditions experienced by the client device based on the at least one problem signature;
identifying occurrence of at least one transient fault condition in the wireless local area network based on the situational awareness state by determining performance degradation of previously connected access points connected to the client device; and
modifying settings of at least one of the access point and the client device of wireless local area network based on the performance degradation of the previously connected access points.

2. The method of claim 1, wherein the at least one primary performance parameter comprises packet latency, data throughput, packet loss percentage, channel receive ratio, number of retries, receiver noise, received signal strength indicator, busy time, count of co-channel access points, beacon interval, or combinations thereof.

3. The method of claim 1, wherein the at least one derived performance parameter comprises short term access point change rate, long term access point change rate, wireless coverage, access point coverage, or combinations thereof.

4. The method of claim 1, wherein the at least one problem signature comprises congestion, co-channel interference, sub-optimal roaming, service level agreement violations, access point instability, or combinations thereof.

5. The method of claim 1, wherein defining a situational awareness state comprises defining the situational awareness state based on the at least one primary performance parameter, the at least one derived performance parameter, the at least one identified problem signature, or combinations thereof.

6. The method of claim 1, further comprising performing at least one of logging the occurrence of the at least one transient condition and modifying the network settings of the wireless local area network in response to the occurrence of the at least one transient fault condition.

7. The method of claim 1, wherein identifying the occurrence of at least one transient fault condition in the wireless local area network comprises processing the situational awareness state via one or more analytic functions.

8. The method of claim 7, wherein processing the situational awareness state comprises detecting service level agreement violations, and wherein detecting the service level agreement violations comprises:
obtaining at least one service level agreement parameter from a media access control layer of the wireless local area network;
comparing the at least one service level agreement parameter to a determined threshold value; and
logging one of a service level violation warning or a service level violation error based on the comparison.

9. The method of claim 8, wherein the at least one service level agreement parameter comprises data throughput, packet latency, packet loss percentage, or combinations thereof.

10. The method of claim 7, wherein processing the situational awareness state comprises evaluating congestion conditions at the client device.

11. The method of claim 10, wherein evaluating the congestion conditions comprises:
defining one of a state of congestion due to channel occupancy and a state of congestion due to network impairment based at least on packet latency and number of retries; and
determining one of a root cause of the state of congestion due to channel occupancy based on one or more states of channel receive ratio, count of co-channel access points, or combinations thereof and a root cause of the state of congestion due to network impairment based on one or more states of channel receive ratio, received signal strength indicator, count of co-channel access points, noise, or combinations thereof.

12. The method of claim 11, further comprising modifying the network settings of the wireless local area network based on the determined root cause of the defined state of congestion via a wireless local area network controller.

13. The method of claim 7, wherein processing the situational awareness state comprises evaluating stability of at least one access point in the wireless local area network.

14. The method of claim 13, further comprising:
identifying at least a first change in connection between the client device and the at least one access point of the wireless local area network within a determined polling interval;
incrementing an access point change counter corresponding to at least the first change in connection between the client device and the at least one access point; and
determining a count of unique access point connections corresponding to the client device within the determined operating interval.

15. The method of claim 14, further comprising:
determining a time interval taken by a value of the access point change counter to exceed a determined change threshold; and
defining an instability condition of the uplink between the client device and the at least one access point based on one or more of the value of the access point change counter exceeding the determined change threshold, the count of unique access point connections corresponding to the client device exceeding a determined unique access point connection threshold, and the time interval taken by the value of the access point change counter to exceed the determined change threshold.

16. The method of claim 15, further comprising modifying settings corresponding to the at least one access point in response to the instability condition of the connection.

17. The method of claim 7, further comprising:
obtaining a received signal strength indicator (RSSI) value from a first connected access point to the client device during one or more time slots;
comparing the RSSI value to a determined RSSI threshold; and
calculating one of a first consecutive low-RSSI time slot count corresponding to the first connected access point, and a first consecutive high-RSSI time slot counter corresponding to the first connected access point based on the comparison.

18. The method of claim 17, further comprising:
comparing the first consecutive low-RSSI time slot count to a determined first threshold;
comparing the first consecutive high-RSSI time slot count to a determined second threshold;
identifying a first performance degradation condition corresponding to at least the first access point based on the comparison.

19. The method of claim 18. further comprising:
comparing a second consecutive high-RSSI time slot count corresponding to at least a second previously connected access point to the client device with the determined second threshold; and
identifying a second performance degradation condition corresponding to the wireless local area network based on the comparison.

20. A wireless local area network, comprising;
at least one wireless access point;
at least one wireless local access network controller;
at least one client device coupled to the wireless local area network via an uplink and a downlink to the at least one access point, comprising:
  a processor unit;
  a wireless analytics unit, operatively coupled to the processor unit and configured to:
    receive at least one primary performance parameter corresponding to the wireless local area network for at least one operating interval of the client device uplink to the at least one access point of the wireless local area network;
    compute at least one derived performance parameter based on the at least one primary performance parameter;
    analyze trends of the at least one primary performance parameter and the at least one derived performance parameter to identify occurrence of at least one problem signature representative of a known network error condition experienced by the client device;
    define a situational awareness state characterizing the network conditions experienced by the client device based on the at least one problem signature;
    identify occurrence of at least one transient fault condition in the wireless local area network based on the situational awareness state by determining performance degradation of previously connected access points connected to the client device; and
    modify settings of at least one of the access point and the client device of the wireless local area network based on the performance degradation of the previously connected access points.

21. A client device, coupled to a wireless local area network via an uplink and a downlink to at least one access point, the client device comprising:
  a processor unit; and
  a wireless analytics unit, operatively coupled to the processor unit and configured to:
    receive at least one primary performance parameter corresponding to the wireless local area network for at least one operating interval of the client device uplink to the at least one access point of the wireless local area network;
    compute at least one derived performance parameter based on the at least one primary performance parameter;
    analyze trends of the at least one primary performance parameter and the at least one derived performance parameter to identify occurrence of at least one problem signature representative of a known network error condition experienced by the client device;
    define a situational awareness state characterizing the wireless local area network conditions experienced by the client device based on the at least one problem signature;
    identify occurrence of at least one transient fault condition in the wireless local area network based on the situational awareness state by determining performance degradation of previously connected access points connected to the client device; and
    modify settings of at least one of the access point and the client device of the wireless local area network based on the performance degradation of the previously connected access points.

* * * * *